March 17, 1970     W. J. LANDEN     3,501,227
REARVIEW MIRROR
Filed Nov. 3, 1967     3 Sheets-Sheet 1
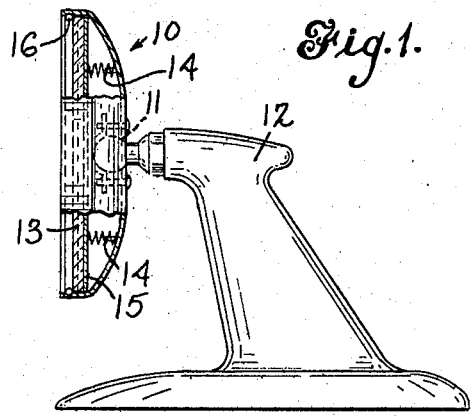
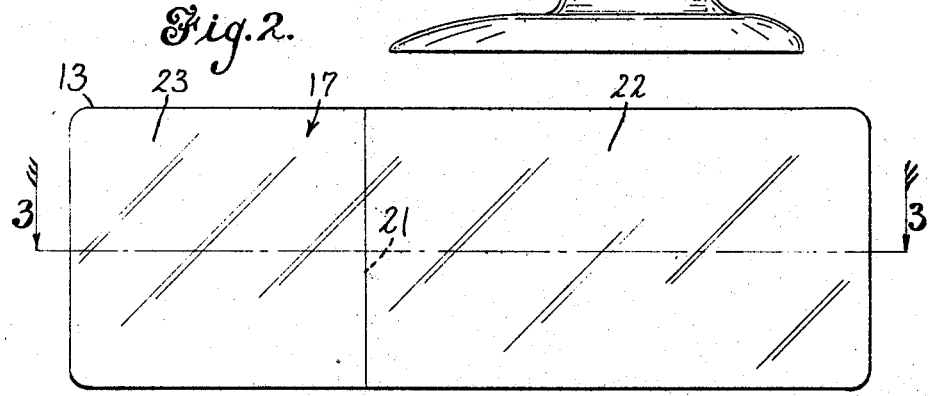
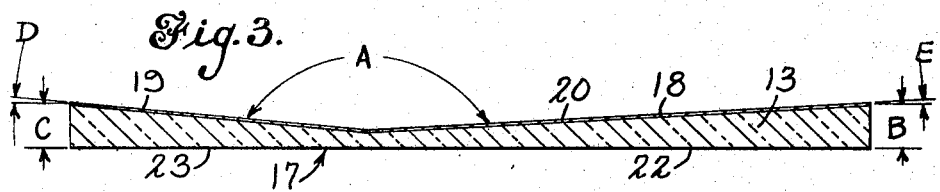
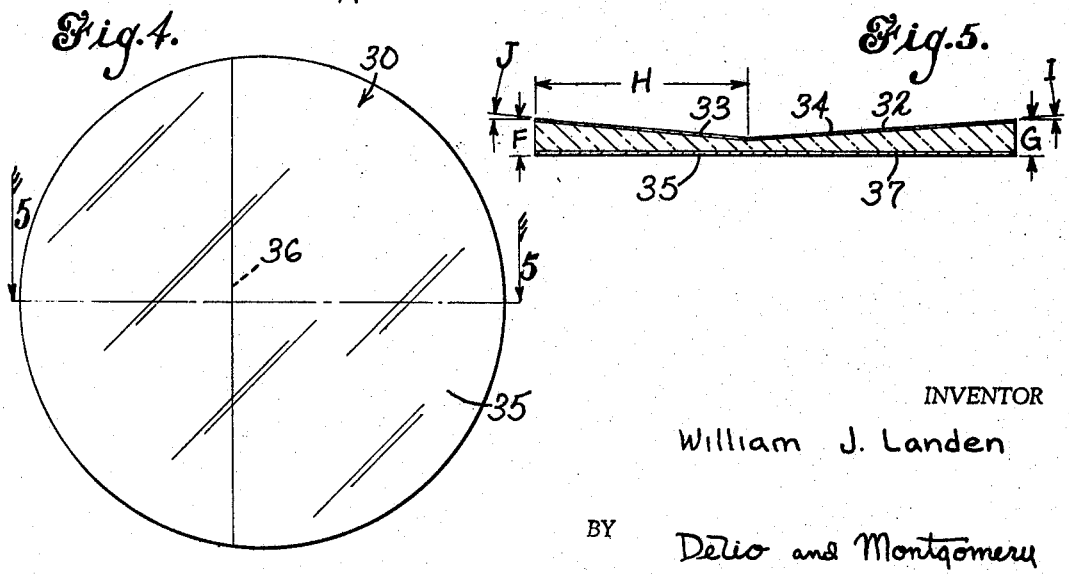
INVENTOR
William J. Landen
BY Delio and Montgomery
ATTORNEYS March 17, 1970 W. J. LANDEN 3,501,227
REARVIEW MIRROR Filed Nov. 3, 1967 3 Sheets-Sheet 2

INVENTOR
William J. Landen

BY Delio and Montgomery
ATTORNEYS

March 17, 1970     W. J. LANDEN     3,501,227
REARVIEW MIRROR

Filed Nov. 3, 1967     3 Sheets-Sheet 3

INVENTOR
William J. Landen

BY DeLio and Montgomery
ATTORNEYS

United States Patent Office 3,501,227
Patented Mar. 17, 1970

3,501,227
REARVIEW MIRROR
William J. Landen, Cheshire, Conn., assignor to Landen Corporation, Cheshire, Conn., a corporation of Connecticut
Continuation-in-part of application Ser. No. 432,640, Feb. 15, 1965. This application Nov. 3, 1967, Ser. No. 685,228
Int. Cl. G02b 5/08
U.S. Cl. 350—303                                     4 Claims

ABSTRACT OF THE DISCLOSURE

This disclosure relates to a rear-view mirror for a vehicle. The mirror body is formed of a unitary base material defining surfaces in two different planes, which planes intersect to define a straight line on said base material. The surfaces define a large obtuse angle and are coated with a metallic reflective material to provide two mirror surfaces residing on the same base material.

---

This application is a continuation-in-part of co-pending application Ser. No. 432,640, filed Feb. 15, 1965, now abandoned.

This invention relates to mirrors, and more particularly relates to mirrors having plural reflective surfaces.

This invention provides a mirror which may be very economically formed without requiring grinding and polishing operations and which is highly adaptable to high volume manufacturing operations. Vehicle operators are perpetually concerned about the presence of an overtaking vehicle in so-called "blind spots" which are located toward the rear and immediately adjacent the operator's vehicle. Many vehicles are equipped with both an inside rear-view mirror and an outside rear-view mirror to detect the presence of trailing vehicles. However, the inside mirror will not reveal the presence of a vehicle in the so-called "blind spots" and the outside rear-view mirror, which is adjusted to reflect a field of vision in the vehicle lane next left to the operator, produces a field of vision behind the so-called "blind spot" on that side and thus the operator in changing from a right-hand to a left-hand lane, to be safe, must glance over his left shoulder besides checking his rear-view mirror before pulling out into the adjacent lane.

To overcome this problem, it has been proposed that vehicle rear-view mirrors be utilized that have plural reflective planes so as to give the vehicle operator a field of vision immediately behind his vehicle and also closely adjacent the lane to his left to eliminate the blind spots and detect the proximity of overtaking vehicles. Various mirrors of this type are disclosed in the prior art and, for the most part, comprise separate mirrors hinged one to the other. Additionally, some plural reflective plane mirrors have been suggested which comprise a mounting bracket having mirrors therein disposed at angles to one another. Such mirrors are expensive in construction in that they require not only two separate mirrors but special brackets for holding the mirrors in predetermined or adjustable relationship to each other. It has further been proposed to make such a mirror by grinding a piece of glass so as to provide two reflective surfaces. However, the grinding operation greatly multiplies the cost of such mirrors. In fact, the major cost of an automotive rear-view mirror resides in the preparation of the glass body of the mirror in that it must be ground and polished before being coated with a reflective coating on one side thereof. It is not known that any mirror having plural reflective surfaces has been publicly or commercially acceptable. This is due, primarily it is believed, to the high cost of producing such mirrors.

In view of the foregoing limitations and deficiencies of presently known rear-view mirrors, and the cost of mirrors in general, the present invention provides a new and improved mirror construction which lends itself to large volume manufacture and which is economical in cost. This invention further provides a mirror body which, unlike glass, requires no grinding or polishing operations and utilizes a mirror base having a surface to which a reflective coating is applied.

Accordingly, an object of this invention is to provide a new and improved plural plane rear-view mirror.

Another object of this invention is to provide a new and improved mirror of a molded plastic body.

Another object of this invention is to provide a new and improved vehicle rear-view mirror.

A further object of this invention is to provide a new and improved vehicle, plural reflecting plane, rear-view mirror of economical construction.

Briefly state, the invention in one form thereof comprises a mirror having a formed unitary body defining two or more planar surfaces which intersect to define a straight line. The reflective surfaces are coated with a reflective material which provides two adjacent mirrors. The surfaces define a large obtuse angle which is so selected that a car leaving the main field of view of the mirror enters the auxiliary field of view without the viewer losing the presence of an overtaking vehicle in his rear-view mirror.

The features of the invention which are believed to be novel are pointed out with particularity and distinctly claimed in the concluding portion of this specification. However, the invention both as to its manufacture and operation, together with further objects and advantages thereof, may best be appreciated by reference to the following detailed description taken in conjunction with the drawings, wherein:

FIG. 1 is a side elevational view of an automobile rear-view mirror assembly including mounting bracket and mounting frame with a portion of the frame in half section;

FIG. 2 is a front elevation of the reflective mirror of the assembly of FIG. 1;

FIG. 3 is a cross-sectional view of the mirror of FIG. 2 seen in the plane of line 3—3 of FIG. 2;

FIG. 4 is a front elevational view of a mirror of circular configuration embodying the invention;

FIG. 5 is a cross-sectional view of the mirror of FIG. 4 seen in the plane of line 5—5 of FIG. 4;

Figure 6:
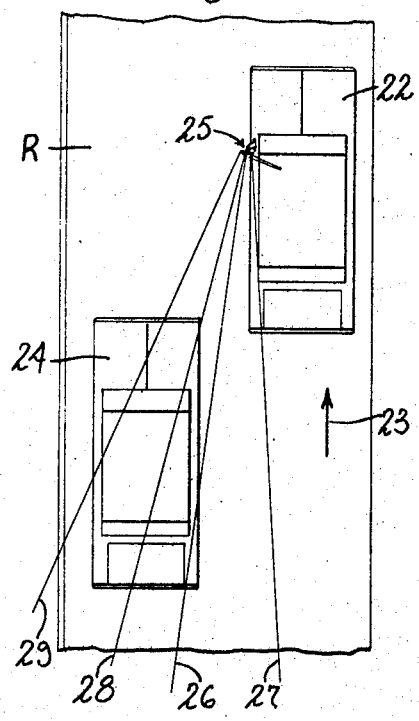
FIG. 6 is a schematic diagram in plane view of a vehicle having a mirror embodying the invention mounted thereon and an overtaking vehicle to the left thereof.

FIG. 1 illustrates a typical vehicle rear-view mirror construction comprising a metallic frame 10 which may be pivoted about a spherical joint 11 carried by a mounting bracket 12 adapted to be mounted to the body of a vehicle. The frame 10 receives a mirror 13 which rests against resilient means which may be in the form of springs 14 bearing on a backing plate 15. Mirror 13 may be retained within frame 10 against the bias of the springs 14 by a plastic bead 16.

The mirror 13 which embodies the invention has a planar viewing surface 17 and primary and secondary reflective surfaces 18 and 19, respectively, which are disposed at a large obtuse angle A with respect to one another. The reflective surfaces 18 and 19 are coated with a metallic reflective coating material 20, preferably aluminum, as will hereinafter be described. For reasons hereinafter described, it is preferred that the angle subtended by the planes in which surfaces 18 and 19 reside within the range of essentially 171 to 177 degrees. The side end surfaces of the mirror body have the dimensions B and C which are preferably equal. Line 21 defined by the intersection of the planes in which the surfaces 18 and 19 reside is to the left of center to give a larger reflective field to portion 22 of the mirror than to portion 23. For this reason the angles D and E are unequal in order that the dimensions B and C may be made equal and thereby facilitate mounting of mirror body 13 in frame 10.

In accordance with a first embodiment of the invention, the mirror body 13 is a molded thermoplastic material. Materials which are suitable for this purpose are acrylic resins and polycarbonates. A suitable polycarbonate resin is available under the trademark Lexan from the General Electric Company. However, the acrylic resins and, more specifically, methyl methacrylates are preferred because of their higher degree of transparency. Suitable acrylic resins are available under the trademark Plexiglas from Rohm and Haas; Lucite from E. I. du Pont de Nemours and Company; and Acrylite from American Cyanamid. The acrylic resins, and more particularly methyl methacrylate, have a transparency of approximately 92 percent using perfect ground plate glass as a base. This compares favorably with ordinary window glass which has a transparency of 88 to 90 percent compared to the same base. The polycarbonates, as exemplified by Lexan, has a transparency of 86 to 87 percent of perfect ground plate glass.

The plastic mirror body 13 is cast in a mold having extremely smooth surfaces, preferably chrome plated to insure that the surfaces 17, 18 and 19 are smooth and planar. In accordance with the invention when the mirror bodies are removed from the mold they immediately may have the reflective coating 20 applied thereto without further treatment or preparation. In accordance with the invention the coating 20 is applied by a vacuum metalizing or metal evaporation process. Vacuum metalizing is accomplished in a vacuum chamber which is evacuated to several microns of pressure (millimeters of mercury). The metal forming the reflecting coating to be deposited on the mirror bodies is placed in this chamber and heated to evaporation. Heating is usually accomplished through use of a filament, usually of tungsten, but in some case molybdenum, tantalum or columbium, which is heated to incandescence by passing an electric current therethrough. The metal to be evaporated is placed in or on the filament. When the filament is heated to incandescence, sufficient heat is generated to volatilize the particular metal attached to the filament. It is preferred that the metallic coating 20 be of aluminum because of its relatively low cost and also its low melting point as compared to other common reflective coating materials. However, other metals such as silver or copper may be utilized. In the vacuum chamber, when the metal to be deposited has evaporated, the current through the filament is interrupted and the evaporated metal deposits on the exposed surfaces of the mirror body thereby forming a reflective coating thereon. The viewing surfaces of the mirror bodies may be masked where the mirror body is to be coated on the second or rear surfaces. Thereafter, the vacuum chamber is brought up to atmospheric pressure and the coated mirror body removed.

A suitable vacuum metalizing apparatus or furnace is made by the F. J. Stokes Company of Philadelphia, Pa. and mirror bodies have been suitably coated in the manner described using vacuum metalizing apparatus of that company.

A mirror body may be made in accordance with the invention in only two major steps, first, by molding the mirror body of suitable thermoplastic material, such as methyl methacrylate or a suitable thermosetting resin as hereinafter described, and then by depositing directly on the reflective surfaces thereof a coating of a suitable metal by vacuum metalizing.

The plural reflective planes or surfaces of the mirror of FIGS. 2 and 3 provide a wider field of vision when utilized as a vehicle rear-view mirror and will serve to eliminate the so-called "blind spots" in which the driver of one vehicle loses sight of an oncoming or overtaking vehicle. Reference is now made to FIG. 6 which exemplifies a first vehicle 22 proceeding in the direction of arrow 23 on a road R and a second overtaking or oncoming vehicle 24 immediately to the left and behind vehicle 22.

Utilizing a mirror embodying the invention as indicated by the reference numeral 25, there are two reflective fields of view indicated by the reflective sight lines 26, 27, and 28, 29. The reflective surfaces of mirror 25 are as shown at 18 and 19 in FIG. 2 and should show the vehicle 24 entering sight line 28 as it departs from sight line 26. Otherwise stated, as the vehicle leaves the primary reflective field of view, it should enter the secondary reflective field of view at the same time in order that the driver of vehicle 22 will not lose the presence of oncoming vehicle 24.

I found that this may be accomplished even for small vehicles, such as the Volkswagen and Renault, by proper selection of the included angle between the planes of surfaces 18 and 19. Where the mirror embodying this invention is mounted on the door of vehicle 22 so that the driver views the mirror through the side window, the angle A should be between 174 and slightly over 177 or 177.5 degrees, preferably about 176–177 degrees, for the average size driver. With this angular relationship of the two planes, when a driver adjusts the mirror to obtain the desired field of vision in the major viewing surface of the mirror, the auxiliary viewing portion automatically is directed to cover the "blind spot."

Where the mirror 25 is to be mounted further towards the front of the vehicle or the fender, the angle A will be about 171 to 173 degrees, preferably 172 degrees, assuming the mirror to be about three feet forward of the eye of the driver. As a general rule, the angle A should be essentially 176–177 degrees when the mirror is mounted for viewing through the side window and 172 degrees when the mirror is mounted for viewing through the windshield.

With these angles, the driver of the vehicle 22 will have the front of vehicle 24 in the field of view defined by sight lines 28 and 29 as he loses the rear right fender of vehicle 24 from the field of view defined by sight lines 26 and 27. Side door mounting and, hence, an angle range of 176–177 degrees is preferable. The angle A should be sharply defined to eliminate any tendency toward visual distortion or a deadband.

A mirror embodying the invention may be made in any form and shape, for example, a round mirror is exemplified in FIGS. 4 and 5. This mirror 30 has a transparent body portion 31 with a reflective coating 32 on the reflective surfaces 33 and 34, thereof. In one size this particular mirror has a diameter of 4¼" with the dimension H being 1⅞". In this instance the angle I is 2½ degrees and the angle J is 3½ degrees. The dimensions G and F are held equal at approximately 2.25". This gives a dimension at line 36 of approximately .080". The reflective coating 32 on the rear surfaces 33 and 34 of mirror 30 is preferably aluminum and deposited as heretofore described. FIGS. 4 and 5 illustrate a modification of the invention when a glass section 35 is cemented to the viewing surface 37 of mirror 30 by a transparent cement. The glass section 35 may be utilized to protect the viewing surface 37 against abrasion and resulting cludiness due to scratching. The surface of the materials used in a mirror embodying the invention is not as hard as glass and may become scratched if wiped with a dirty rag or towel. A suitable cement is available from the Epoxy Coating Company of San Francisco, Calif., known as "Crystal Clear" epoxy.

The mirror of FIGS. 4 and 5 may be mounted in a suitably shaped frame of similar construction to that of FIG. 1. In such case the mirror may be retained with a snap ring instead of bead 16.

Figure 7:
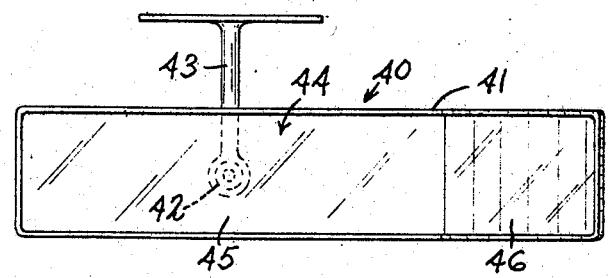
FIG. 7 is a front elevation of an interior vehicle rear-view mirror embodying the invention.
Figure 8:
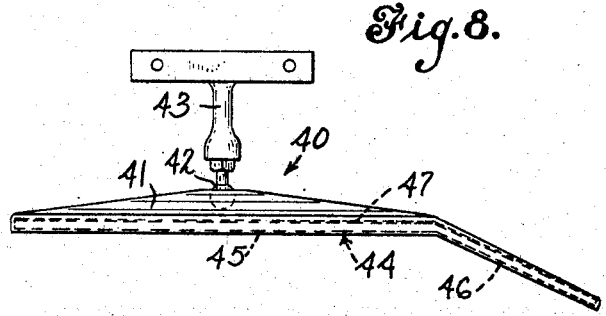
FIG. 8 is a plane view of the mirror of FIG. 7.
Figure 9:
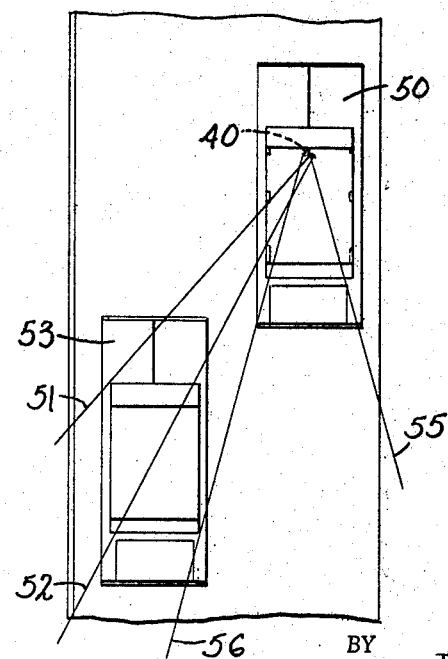
FIG. 9 is a schematic diagram in plane view of a vehicle having the mirror of FIGS. 7 and 8 mounted thereon, and an overtaking vehicle to the left thereof.

The invention is further applicable in making interior rear-view mirrors as shown in FIGS. 7 and 8, which illustrate a mirror assembly 40 comprising a frame 41 pivotally mounted at 42 on a bracket 43 which is, in turn, mountable on either a vehicle dashboard or from the top of the vehicle cab. This mirror assembly includes a mirror body 44 having a primary viewing portion 45 and an auxiliary viewing portion 46, both portions being cast in one piece and having a reflective coating 47 applied to their rear surfaces as heretofore explained. The mirror reflective surfaces reside in planes set to include an angle M of approximately 157 degrees. In mirror 44 the viewing and reflective surfaces of the primary and auxiliary portions are parallel in each portion. However, the important feature is the included angle of the reflective surfaces. With this arrangement, the driver of a vehicle may look into the auxiliary portion 46 of mirror 44 and gain a reflective field of view through the rear left window of his vehicle as exemplified in FIG. 9. As shown in FIG. 9, the mirror assembly 40 in vehicle 50 provides a field of view defined by sight lines 51 and 52 through the rear left window of vehicle 50 which will detect the presence of an oncoming vehicle 53 in the heretofore so-called "blind spot." Moreover, portion 45 of mirror 44 gives a normal field of vision to the rear of the vehicle as defined by sight lines 55 and 56. An oncoming vehicle as exemplified by vehicle 53 will be detected in the field of view defined by sight lines 51 and 52 before it leaves the field of view defined by sight lines 55 and 56 so that the driver of vehicle 50 at no time loses presence of the oncoming vehicle 53.

Figure 10:
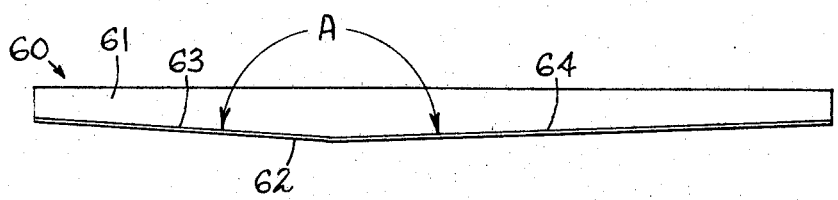
FIG. 10 is a view of another mirror construction embodying the invention seen along the upper edge thereof.

The invention may also be practiced using first surface coating of the reflective coating. A mirror 60 thus constructed is illustrated in FIG. 10. Mirror 60 comprises a base of plastic or other suitable material 61 having a reflective coating 62 on the front surfaces 63 and 64 thereof. The angle A in this construction is defined by the front surfaces 63 and 64 of base material 61.

Figure 11:
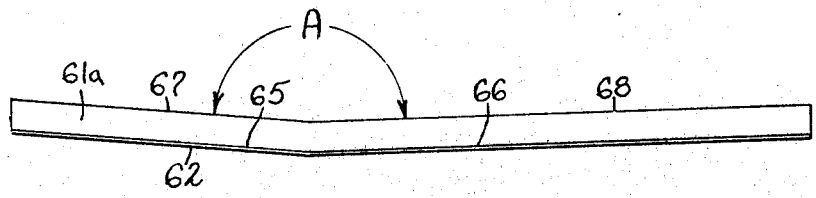
FIG. 11 is a view of a further mirror construction embodying the invention seen along the upper edge thereof.

Alternatively, the base material may be so formed as to conserve the base material. As shown in FIG. 11, a mirror base 61a is formed with parallel front and rear surfaces 65 and 66, and 67 and 68. In this construction the angle A is defined by the back surfaces as well as the front surfaces.

Where the reflective surfaces of the mirror are to be first surface coated on the base member, it is preferable to utilize chrome because of its hardness, resistance to abrasion, etc. It has further been determined that thermosetting resins are suitable for base material and subsequent first surface coating or plating. A preferred res'n is one of the type known as allyl diglycol carbonate which is presently marketed by Pittsburgh Plate Glass Company under the designation CR-39.

Figure 12:
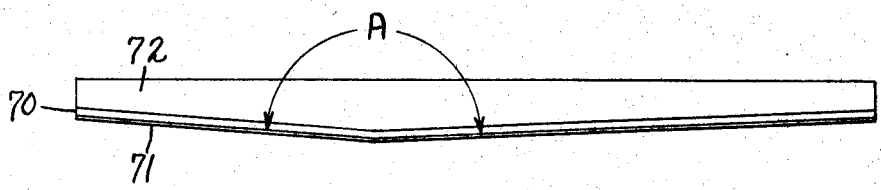
FIG. 12 is a view of a still further mirror construction embodying the invention seen along the upper edge thereof.

In still another embodiment of the invention shown in FIG. 12, a base member 70 is provided of metallic material, such as hard tempered brass. The base member 70 is provided with a first or front surface coating or plating 71 of chrome or other material capable of yielding a mirror surface. In this construction, the base member may be first formed to define the angle A and then have the reflective plating 71 applied. Alternatively, sheets of the base material may first be plated with chrome or other suitable material to give a mirror surface, then the individual mirrors may be cut from the sheet and formed as shown in FIG. 11. Any base material or metal which will accept the chrome or other reflective plating or coating may be used.

Inasmuch as the metal base mirror of FIG. 12 may be somewhat flexible in larger sizes, such as may be used on trucks and buses, a backing member 72 may be provided to impart rigidity to the base member 70. The backing member 72 may be a molded or otherwise formed plastic member and may be suitably bonded to the back of base member 70.

It will be appreciated that an inside rear-view mirror as exemplified in FIG. 8 may be constructed of a base member having a first surface mirror coating or plating thereon.

It may thus be seen that the objects of the invention set forth as well as those made apparent from the preceding description are efficiently attained. Inasmuch as other embodiments of the invention may occur to others skilled in the art, the appended claims are intended to cover all modifications of the disclosed embodiments of the invention as well as other embodiments thereof.

What is claimed is:

1. An outside rearview mirror for an automobile adapted to be mounted on the driver's side thereof to provide a primary rearward field of view and a secondary rearward field of view angularly disposed to the primary field of view, comprising, a unitary mirror base of metallic material, said unitary base being formed to provide surfaces in two planes which planes intersect to define a sharp vertical straight line on said base material and provide a sharp line of demarcation between said surfaces, said surfaces being coated with a metallic reflective material to provide two mirror surfaces residing in generally vertical planes, said mirror surfaces being formed so as to provide a primary and a secondary mirror, the plane of the secondary mirror being so disposed with respect to the plane of the primary mirror that the angle therebetween as measured between the non-viewing sides thereof is no less than 171 degrees so that when the mirror is mounted to the driver's side of an automobile an overtaking vehicle appears in the field of view of the secondary mirror prior to departing from the field of view of the primary mirror, said primary mirror having a greater area than said secondary mirror.

2. An outside rearview mirror for an automobile adapted to be mounted on the driver's side thereof to provide a primary rearward field of view and a secondary rearward field of view angularly disposed to the primary field of view, comprising, a unitary mirror base of molded plastic material, said unitary base being molded to provide surfaces in two planes which planes intersect to define a sharp vertical straight line on said base material and provide a sharp line of demarcation between said surfaces, said surfaces being coated with a metallic reflective material to provide two mirror surfaces residing in generally vertical planes, said mirror surfaces being formed so as to provide a primary and a secondary mirror, the plane of the secondary mirror being so disposed with respect to the plane of the primary mirror that the angle therebetween as measured between the non-viewing sides thereof is no less than 171 degrees so that when the mirror is mounted to the driver's side of an automobile an overtaking vehicle appears in the field of view of the secondary mirror prior to departing from the field of view of the primary mirror, said primary mirror having a greater area than said secondary mirror.

3. The mirror body of claim 2 wherein said reflective coating is on the rear surfaces of said base member.

4. The mirror body of claim 2 wherein said reflective surfaces are on the front of said mirror body.

References Cited

UNITED STATES PATENTS

| | | | |
|---|---|---|---|
| 1,784,710 | 12/1930 | Showalter | 350—293 |
| 2,279,751 | 4/1942 | Hensley | 350—303 |
| 2,514,989 | 7/1950 | Buren | 350—303 |
| 2,763,187 | 9/1956 | Wiener | 350—303 |
| 3,028,794 | 4/1962 | Kinkella | 350—303 |

FOREIGN PATENTS

| | | |
|---|---|---|
| 1,368,579 | 6/1964 | France. |
| 736,382 | 9/1955 | Great Britain. |

DAVID SCHONBERG, Primary Examiner

MICHAEL J. TOKAR, Assistant Examiner